United States Patent [19]

Maichle

[11] Patent Number: 5,794,421
[45] Date of Patent: Aug. 18, 1998

[54] DEVICE FOR REGULATING THE DISTANCE FROM THE GROUND OF A WORKING UNIT OF AN AGRICULTURAL MACHINE

[75] Inventor: Josef Maichle, Beilstein, Germany

[73] Assignee: Robert Bosch GmbH, Stuttgart, Germany

[21] Appl. No.: 704,538

[22] PCT Filed: Feb. 16, 1995

[86] PCT No.: PCT/DE95/00188

§ 371 Date: Aug. 30, 1996

§ 102(e) Date: Aug. 30, 1996

[87] PCT Pub. No.: WO95/23496

PCT Pub. Date: Sep. 8, 1995

[30] Foreign Application Priority Data

Mar. 3, 1994 [DE] Germany ............... 44 06 892.1

[51] Int. Cl.[6] .................. A01O 34/86; A01O 75/14; A01O 75/28
[52] U.S. Cl. .................. 056/10.2 E; 56/DIG. 15
[58] Field of Search ............... 56/10.2 E, 10.2 R, 56/10.2 D, 10.2 F, DIG. 15

[56] References Cited

U.S. PATENT DOCUMENTS 4,942,724  7/1990  Diekhans et al. .............. 56/10.4
5,463,854  11/1995  Chmielewski, Jr. et al. ....... 56/10.2 E
5,473,870  12/1995  Panoushek et al. ............... 56/10.2 E

FOREIGN PATENT DOCUMENTS 0070354  6/1986  European Pat. Off. .
1582161  7/1978  Germany .
3240791  5/1984  Germany .

*Primary Examiner*—Terry Lee Melius
*Attorney, Agent, or Firm*—Michael J. Striker

[57] ABSTRACT

The device for regulating ground clearance of a working unit of an agricultural machine includes a position sensor (11) which detects a position of the working unit (2) relative to the machine and generates a working unit position signal; a pressure sensor (10) which generates a control element pressure signal; a ground clearance sensor (9) which issues a corresponding ground clearance sensor output signal in a contactless manner; and a control device (7) for operating the control element to set the ground clearance according to the ground clearance sensor output signal alone in a first range closest to the ground, according to the working unit position signal alone in a second range furthest from the ground and according to a combined signal in a third transitional range between the first and second ranges, which is equal to a mixture of the ground clearance sensor output signal and the working unit position signal and which varies continuously from the first range to the second range.

7 Claims, 3 Drawing Sheets

DEVICE FOR REGULATING THE DISTANCE FROM THE GROUND OF A WORKING UNIT OF AN AGRICULTURAL MACHINE

BACKGROUND OF THE INVENTION

The invention relates to a device for regulating the ground clearance of a working unit of an agricultural machine and, more particularly, to a device for regulating ground clearance of an agricultural machine including a hydraulic control element for adjusting the ground clearance and a control device for generating a control signal for controlling the control element in accordance with sensor signals from sensors including a position sensor which determines the position of the working unit relative to the agricultural machine and a ground clearance sensor which measures the ground clearance of the working unit.

A hydraulic raising device for a combine is already known from DE-PS 15 82 161, wherein the position of the working unit relative to the combine and the pressures occurring in the hydraulic lift device are determined by measuring techniques. These two measuring signals are combined by means of a summing control and an adjustment output signal is generated, taking into consideration the deviation from a defined set value. Since an adjustment of the position of the working unit—in this case a mowing platform, which is intended for cutting grain at a predetermined stubble height above the ground—does not necessarily lead to maintaining a satisfactory constant stubble height, this device is in need of improvement.

Furthermore, it is known from DE-OS 32 40 791 to also measure the ground clearance of a draw-in member by means of a mechanical sensor member in addition to measuring the contact pressure of a draw-in member of a harvester. However, in this known device both values are separately set and also evaluated, which can lead to inaccuracies in working, for example in case of great unevenness of the ground or at great working speeds.

A mixed value setting in connection with lifting units of agricultural machines is furthermore known from EP-PS 0 070 354 wherein, although a combined evaluation of these different measured values is performed, this control is used for optimized force transfer with plowing machines, wherein the ground clearance has no value.

SUMMARY OF THE INVENTION

It is an object of the present invention to provide an improved device for regulating ground clearance of a working unit of an agricultural machine, which does not have the above-described disadvantages.

According to the invention the device for regulating ground clearance of a working unit of an agricultural machine includes a pressurizable control element in the agricultural machine for setting the ground clearance of the working unit from ground over which the agricultural machine moves; a position sensor which detects a position of the working unit relative to the machine and which generates a working unit position signal characteristic of the position of the working unit; a pressure sensor which measures a pressure occurring in the control element and which generates a control element pressure signal characteristic of the pressure in the control element; a ground clearance sensor which measures a ground clearance of the working unit from the ground in a contactless manner and issues a corresponding ground clearance sensor output signal; and a control device for operating the control element to set the ground clearance of the working unit according to the ground clearance sensor output signal alone as ground clearance control signal in a first range closest to the ground, according to the working unit position signal alone as the ground clearance control signal in a second range furthest from the ground and according to a combined signal equal to a mixture of the ground clearance sensor output signal and the working unit position signal in a third transitional range between the first and second ranges. The combined signal is substantially equal to the ground clearance sensor output signal at a position in the third transitional range closest to the first range and the combined signal contains an increasing proportion of the working unit position signal at positions increasingly close to the second range until the combined signal is substantially equal to the working unit position signal closest to the second range.

The device in accordance with the invention for regulating the ground clearance of a working unit of an agricultural machine is advantageous in that it is possible to perform an optimum evaluation of the sensor output signals in their respectively most advantageous operating ranges by a standardization of influence limits of the sensors in the regulating device within the respective set value range. The pronounced evaluation of the distance signal, obtained contactless in the vicinity of the ground, and the transition, starting at a predetermined height, into a combined evaluation with the position signal allows the use of relatively sensitive sensors for the near range on the one hand and, on the other, a stable regulation also for greater raising heights of the working unit.

In preferred embodiments of the invention it is possible in an advantageous manner to perform an adjustment of the operating conditions as well as the standardization for the evaluation in accordance with control techniques and the regulation of set values for the various modes of operation. Active oscillation damping, which is matched to the respective operational conditions and the particular construction of the machine, leads to a further improvement of the device. By knowing all general conditions during adjustment it is still possible to obtain satisfactory results only with the position adjustment, even if the ground clearance sensor fails.

Particularly good results are obtained if the distance measurement is performed with at least one ultrasonic sensor, since this measuring process is independent to a large extent of environmental conditions and can be well processed in electronically designed adjusting devices.

In accordance with a particularly preferred embodiment of the invention it is possible in an advantageous manner to maintain a mowing platform of a combine at a predetermined set height (stubble height) above the ground. Only the setting of the stubble height at an adjustment member is performed by the operator during a work interval; the differently weighted evaluation of the sensor signals is performed in the control device preferably equipped with an appropriately programmed microcontroller, so that during the work interval the mowing platform slides, so to speak swimmingly, across the contours of the ground, since the measured ground clearance permanently leads to an adjustment of the different measured value evaluation zones.

BRIEF DESCRIPTION OF THE DRAWINGS

An exemplary embodiment of the device in accordance with the invention will be explained by means of the drawings, in which.

DESCRIPTION OF THE PREFERRED EMBODIMENT

Figure 1:
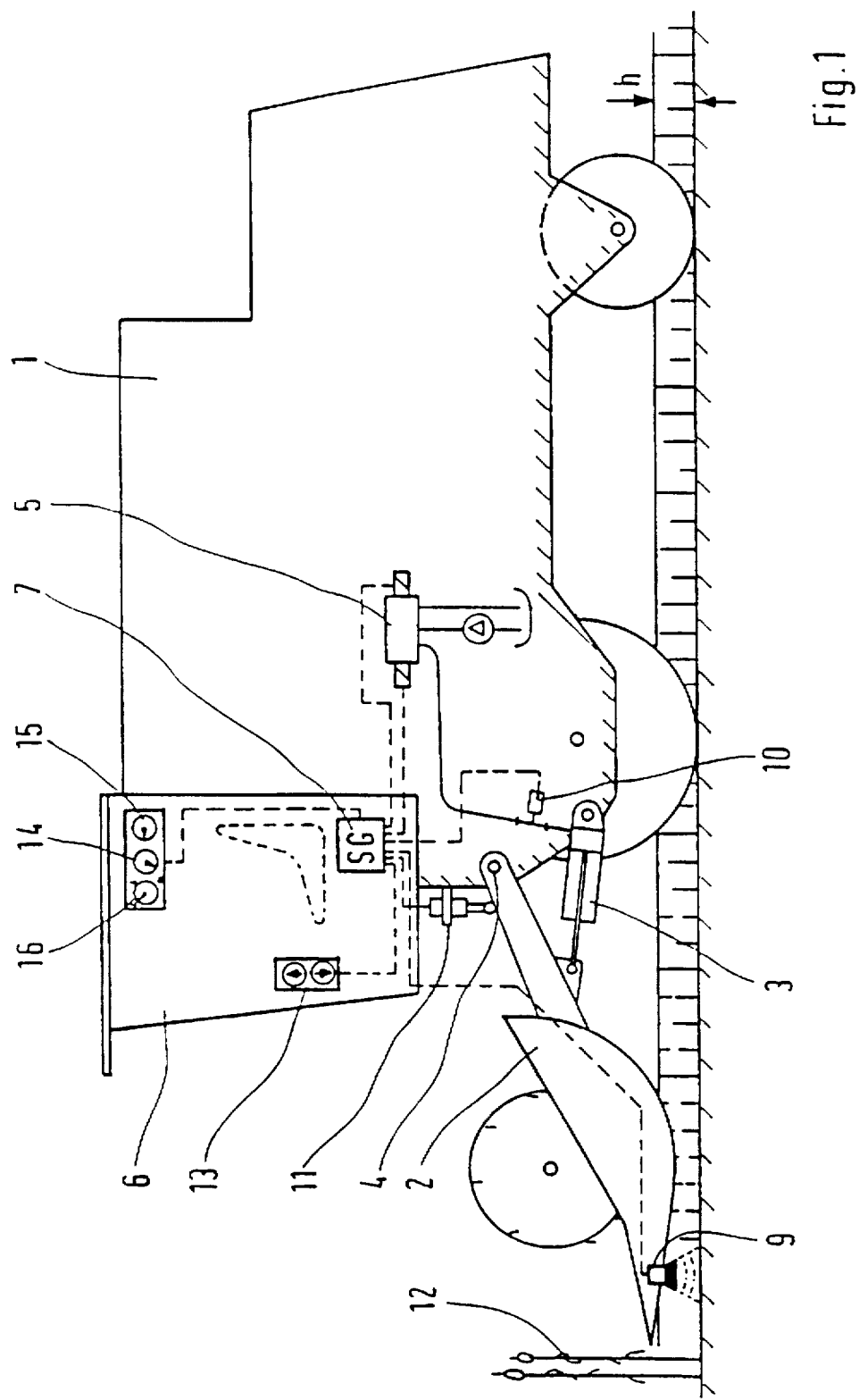
FIG. 1 is a diagrammatic side view of a combine with a ground-clearance-controlled mowing platform.

A combine 1 is represented as an agricultural machine in FIG. 1, which has a mowing platform 2 as the working unit on its front. The position of the mowing table 2 in relation to the combine 1 can be adjusted around a rotating shaft 4 via a hydraulic control element 3. A control valve 5 supplies the control element 3 with hydraulic fluid for generating the pressure needed for the required adjustment of the mowing table 2. An electronic control device 7 in a cabin 6 is schematically indicated which, as the output value, generates the adjustment signal for the control valve 5. The output signal of an ultrasonic sensor 9 (while a second ultrasonic sensor at the other end of the mowing platform 2 is not visible), the output signal of a pressure sensor 10 and the output signal of, for example, an inductive position sensor 11 are supplied to the control device 7 as actual values.

In this case the ultrasonic sensor 9 detects the distance of the mowing platform 2 from the ground, which directly correlates with the stubble height h of a cut-off harvested material 12; the position sensor 11 measures the position of the mowing platform 2 relative to the combine 1, wherein this position does not directly correlate with the ground distance because of structural data of the combine and/or irregularities of the ground. The pressure sensor 10 detects the contact pressure of the mowing platform 2 on the ground in the position of rest or on the holder of the machine. The pressure signal can also be used for detecting and active (controlled) damping of fluctuations in the pitch of the mowing platform 2.

As set values, the control device 7 is provided with the output signals of an operating key 13 for the forced up and down movement of the mowing table 2, a set value adjuster 14 for setting the desired stubble height h, and a set value adjuster 15 for a desired contact pressure of the mowing platform 2. Further than that, there is a mode of operation selection switch 16 present, whose function will be explained in the course of the following explanations in respect to FIGS. 2 to 4.

Figure 2:
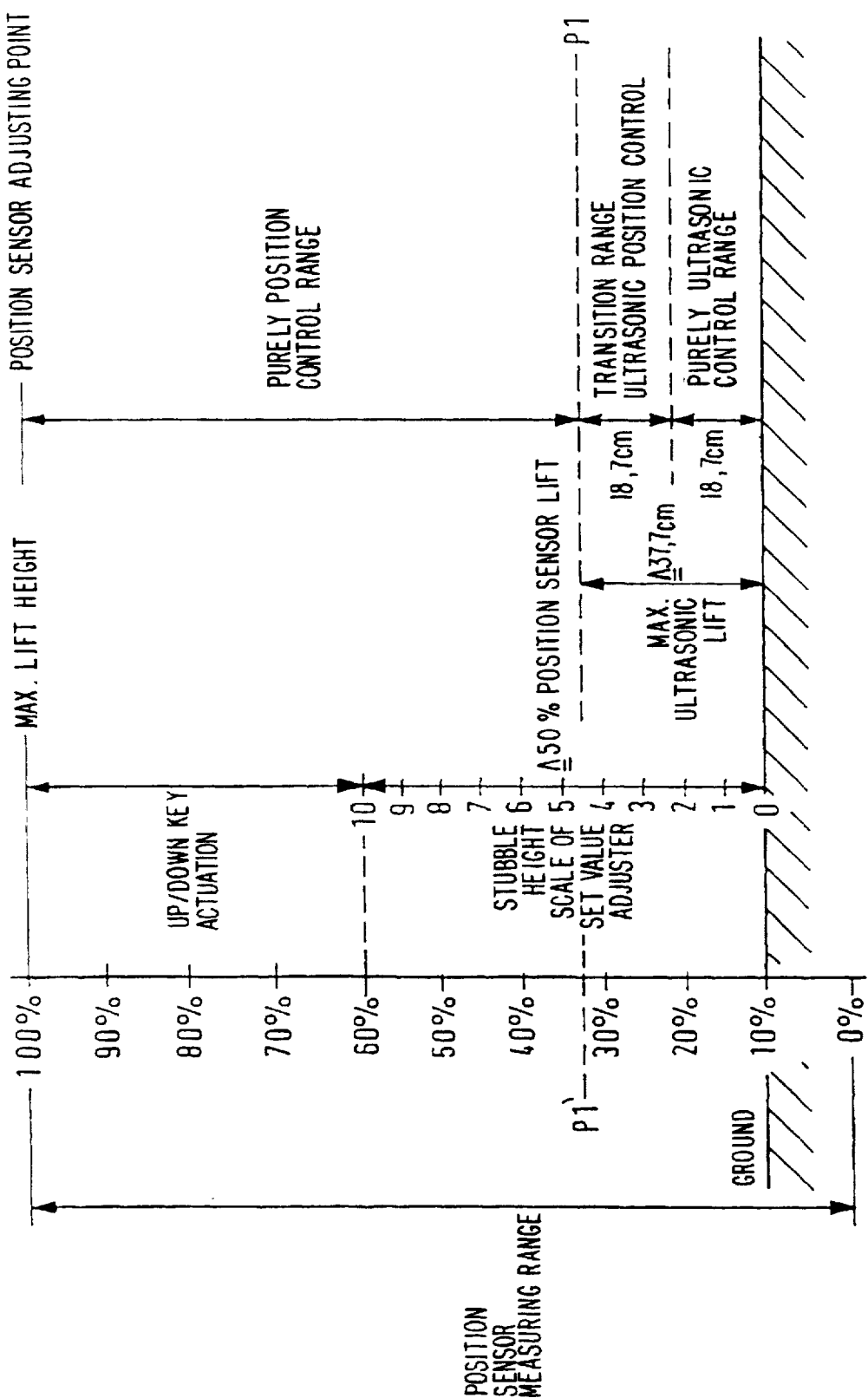
FIG. 2 is a diagram relating to the work and effectiveness areas of the sensors on the combine.
Figure 3:
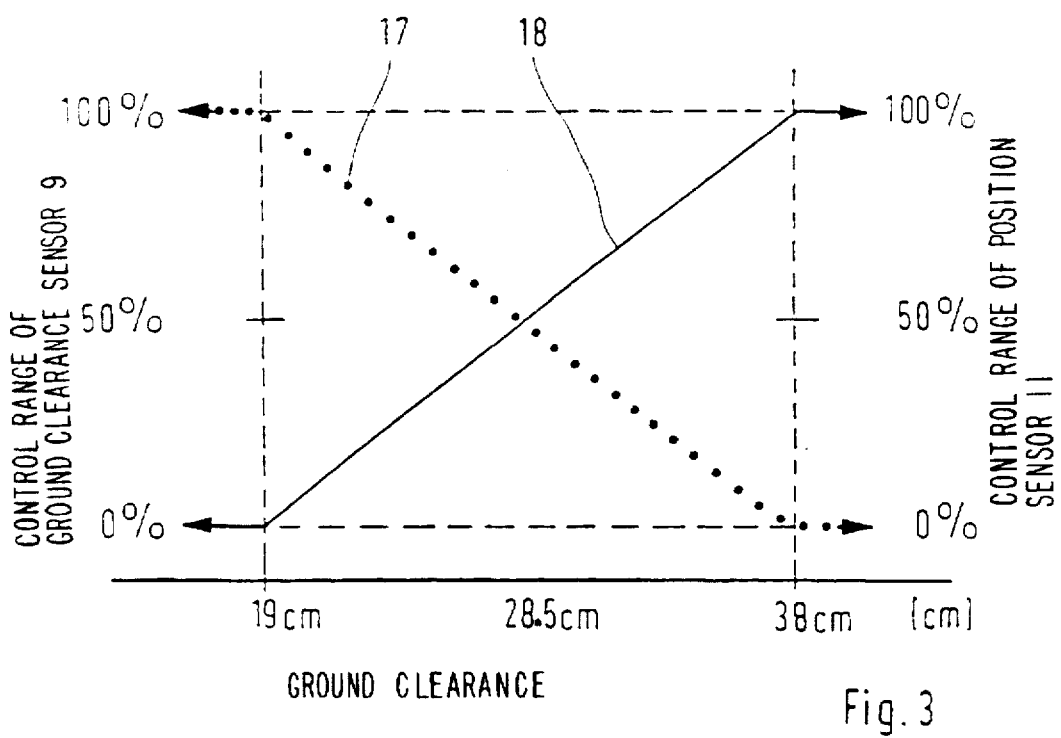
FIG. 3 is a diagram relating to a combination of the work areas of a position and distance control.

The function of the exemplary embodiment represented here will be explained by means of FIG. 2, wherein reference is made to FIGS. 3 and 4. 100% of the measuring range of the position sensor 11 is represented on the left scale of the diagram in FIG. 2, which detects the entire raising range of the mowing platform 2 and furthermore also detects the ground limits in, for example, 10% of the measuring range. The set values which are a part of the respective signal of the position sensor 11 are standardized in an adjustment process. In this case this signal is set in such a way that the entire cylinder lift is covered. The corresponding signal when the mowing table 2 is in contact with the ground is a function of its structural data and is learned, so to speak, in the course of the adjustment process. A set value adjustment range between 10% and 60% is standardized in the instant exemplary embodiment; this range can be 20% to 70%, for example, with a differently designed mowing platform 2.

Further than that, it is necessary to make the signal of the position sensor 9 known to the control device 7 by means of an adjustment, at which signal the ultrasonic sensor 9 dips into its measuring range (straight line P1 at a ground clearance of 37.4 cam in FIG. 2) with the combine standing horizontally, and at which signal the mowing platform 2 rests on the ground. The set values for the ultrasonic sensor 9 used in the control device 7 are set in accordance with the signals detected in this manner. The control device 7 is programmed in such a way that starting with the 60% marker (corresponding to 50% of the measuring range of the position sensor 11 above the ground), a transition from a control of the ground clearance to a pure control of the mowing table 2 via the operating key 13 takes place.

With the exemplary embodiment described, a control of the ground clearance to a value set by means of the set value adjuster 14 can be performed in the range between 10% and 60% of the measuring range of the position sensor 11. This range is divided into three zones, wherein in the lowest, i.e. near the ground, zone the output signal of the ultrasonic sensor 9 is exclusively employed. This zone approximately includes half the measuring range of the ultrasonic sensor, which is approximately 38 cm. In the zone above it, also approximately 19 cm, the combination of the output signals of the ultrasonic sensor 9 and the position sensor 11 is evaluated, this in a linearly overlapping manner shown in FIG. 3. The straight line 17 shows the influence of the ultrasonic sensor 9, which becomes weaker, and the straight line 18 the increasing influence of the position sensor 11 as a function of the ground clearance (here 19 to 38 cm) measured by means of the ultrasonic sensor.

In the third zone which extends up to the 100% marker of the control range of the position sensor 11, position control is performed purely by means of the output signal of the position sensor 11. In the diagram of FIG. 2, the adjustment range of the set value adjuster 14 is represented next to the measuring range of the position sensor 11 and has a scale range between 0 to 10, wherein here the limit of the measuring range of the ultrasonic sensor 9 lies at a scale value of 4.5.

Thus, when operating the described combine 1, following the performed adjustment, lowering of the mowing platform 2 controlled by means of the operating key 13 to the stubble height set by means of the set value adjuster 14 can take place without jerking and proportionally, even if the initial position lies far above the measuring range of the ultrasonic sensor. All standardized association zones of the sensors 9 and 11 for the control (see FIG. 2) are passed without jerking, so to speak, since the control device assures a sliding transition. Control of the ground clearance exclusively by means of the position sensor 11 would not be usable here because of the low-frequency pitch movements of the combine 1 during its travel.

Figure 4:
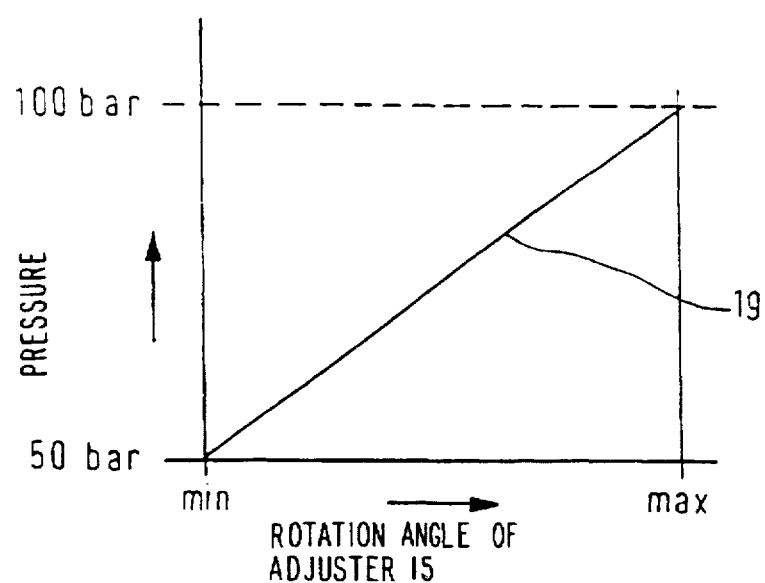
FIG. 4 is a diagram relating to pressure regulation.

A diagram regarding the course of the pressure signal 10 detected by means of the pressure sensor 10 is shown in FIG. 4. In this case the minimum pressure when the mowing platform 2 rests on the ground should be 50 bar, and the maximum pressure with the mowing platform completely raised should be 100 bar. Thus, the pressure set value standardized during the adjustment process is shown on the perpendicular axis of the diagram, and the angle of rotation of the set value adjuster 15 between the minimum and maximum position is shown on the horizontal axis. This adjustment process of the set values is also automated to a large extent, the same as with the ones described above.

In the course of regulating the contact pressure of the mowing platform 2, the latter rests on the ground with a predeterminable residual force in order to keep wear and frictional forces at a minimum. This residual force is kept constant to a large degree, wherein it is assumed that when raising the mowing table 2 in accordance with the exemplary embodiment a pressure higher than 50 bar is generated, and no control is performed below 50 bar.

Further than that, the control device 7 is embodied in such a way that the pressure control is switched off when the operating key 13 is actuated, and lowering and raising is performed in the above described manner in a proportionally controlled way. In this case the pressure control is only activated after the movement has stopped. Pressure control by means of the pressure control 10, the hydraulic control element 3, the control valve 5 and the control device 7 makes possible an excellent control of interfering pressure amplitudes in the control element 3 during the operation and transport of the combine 1, by means of which possibly occurring pitch movements of the combine 1 are prevented.

I claim:

1. A device for regulating ground clearance of a working unit of an agricultural machine, said device including
 - a pressurizable control element (3) in the agricultural machine for setting the ground clearance of the working unit from ground over which the agricultural machine moves;
 - a position sensor (11) which detects a position of the working unit (2) relative to the machine and which generates a working unit position signal characteristic of said position of the working unit (2);
 - a pressure sensor (10) which measures a pressure occurring in the control element (3) and which generates a control element pressure signal characteristic of said pressure in the control element (3);
 - a ground clearance sensor (9) which measures a ground clearance of the working unit (2) from the ground in a contactless manner and issues a corresponding ground clearance sensor output signal; and
 - a control device (7) for operating the control element to set the ground clearance of the working unit according to said ground clearance sensor output signal alone in a first distance range closest to the ground, according to said working unit position signal alone in a second distance range furthest from the ground and according to a combined signal equal to a mixture of the ground clearance sensor output signal and the working unit position signal in a third transitional distance range between the first and second distance ranges,
 - wherein said combined signal is substantially equal to said ground clearance sensor output signal at a position in the third transitional distance range closest to the first distance range and said combined signal contains an increasing proportion of the working unit position signal at positions increasingly close to the second distance range until said combined signal is substantially equal to said working unit position signal closest to said second distance range.

2. The device as defined in claim 1, wherein the control device has means for standardizing set value adjustment ranges and for combining said signals for respective configurations of the agricultural machine, and wherein the ground clearance sensor (9) has a distance measurement range having a first half closest to the ground in which the ground clearance sensor output signal is exclusively employed by the control device (7) for operating the control element and a second half furthest from the ground in which the control device uses said combined signal for operating the control element.

3. The device as defined in claim 1, further comprising an operating key (13) connected with said control device (7) for transmission of an operating signal to said control device so that said control device operates said control element to raise or lower said working unit and a first set value adjuster (15) connected with said control device (7), said first set value adjuster (15) having means for setting a predetermined set value of the ground clearance in the control device (7), and wherein the control device (7) has three modes of operation including a first mode of operation for adjusting the ground clearance to the predetermined set value set by the first set value adjuster (14) after continuous lowering of the working unit (2) by operation of the operating key (13), a second mode of operation for a rest position of the working unit in which a residual contact pressure of the working unit (2) lowered to the ground is controlled and a third mode of operation for transport in which the working unit (2) is set to a predetermined fixed height by operation of the operating key (13).

4. The device as defined in claim 3, wherein the control device (7) has means for active oscillation damping of movements of said working unit from said predetermined set value in said first mode of operation and from said predetermined fixed height in said third mode of operation.

5. The device as defined in claim 3, wherein said ground clearance sensor (9) is an ultrasonic sensor.

6. The device as defined in claim 5, further comprising a selector switch (16) connected to said control device (7) and a second set value adjuster (15) connected to said control device (7), said second set value adjuster (15) including means for setting a predetermined set value for said pressure in said control element in the control device (7) and said selector switch being operable to select one of said three modes of operation of said control device; and wherein the agricultural machine is a combine, the working unit (2) is a mowing platform, the agricultural machine has a hydraulic system including means for operating the control element by means of a hydraulic fluid, said means for operating the control element including a control valve (5) for regulating a flow of the hydraulic fluid to the control element to change a position of the mowing platform, said control device (7) has a first, second and third input at which the respective ground clearance sensor output signal, control element pressure signal and working unit position signal are input; and said ultrasonic sensor is attached to an underside of said mowing platform and faces the ground.

7. The device as defined in claim 6, wherein the control device (7) includes a microprocesor with a non-volatile memory and means for adjusting said set values when said working unit (2) is actuated prior to performing work with said agricultural machine, said means for adjusting said set values including means for storing the ground clearance sensor output signal in said non-volatile memory when said ground clearance sensor moves into said distance measurement range, means for storing said control element pressure signal in the non-volatile memory when said working unit (2) is fully raised and means for storing said working unit position signal in said non-volatile memory when said working unit (2) is resting on the ground.

* * * * *